United States Patent
Dail (10) Patent No.: US 7,163,185 B2
(45) Date of Patent: Jan. 16, 2007

(54) SYSTEM, METHOD AND ARTICLE OF MANUFACTURE FOR THREE DIMENSIONAL BRIDE AND GROOM CAKE KIT

(76) Inventor: Lisha Annette Dail, 7020 SW. 15 Pl., Ocala, FL (US) 34474

( * ) Notice: Subject to any disclaimer, the term of this patent is extended or adjusted under 35 U.S.C. 154(b) by 408 days.

(21) Appl. No.: 10/351,853

(22) Filed: Jan. 28, 2003

(65) Prior Publication Data

US 2003/0148001 A1     Aug. 7, 2003

Related U.S. Application Data

(60) Provisional application No. 60/355,422, filed on Feb. 7, 2002.

(51) Int. Cl.
*A47J 37/01*  (2006.01)

(52) U.S. Cl. ............... 249/120; 249/121; 249/139; 249/163; 249/171; 249/DIG. 1; 220/573.1; 99/426

(58) Field of Classification Search ............... 249/120, 249/121, 139, 163, 170, 171, DIG. 1; 220/573.1, 220/573.4; 99/426, 430; 426/104, 512; D7/354
See application file for complete search history.

(56) References Cited

U.S. PATENT DOCUMENTS

| | | | | |
|---|---|---|---|---|
| 572,509 | A | * | 12/1896 | Wilson ............... 249/144 |
| 4,644,858 | A | * | 2/1987 | Liotto et al. ............... 99/449 |
| 5,537,917 | A | * | 7/1996 | Schiffer et al. ............... 99/442 |
| 5,678,475 | A | * | 10/1997 | Villar Otero ............... 99/432 |

\* cited by examiner

*Primary Examiner*—Donald Heckenberg (57) ABSTRACT

A baking system that allows the user to create a three-dimensional cake having the form of a bride and groom, or man and woman. The substantial part of the human forms is accomplished by a molding process using cake, candy or chocolate. Utilizing 2 piece pans; having a removable outer rim with spring action hinges, locking spring action clasps, and corresponding pan insets to complete the process. The pan insets are specifically designed to become the interior support system for the cake structure. The entire cake is molded, baked, poured, and stacked prior the removal of the outer rims of the pans. Fitted, plastic snap-on storage lids are included, enabling the user to bake the cakes in advance, and keep them fresh until ready to assemble and decorate. The system offers the flexibility of easy creation, easy storage, easy assembly, and easy transportation of the completed assembly.

10 Claims, 11 Drawing Sheets

SYSTEM, METHOD AND ARTICLE OF MANUFACTURE FOR THREE DIMENSIONAL BRIDE AND GROOM CAKE KIT

CROSS REFERENCE TO RELATED APPLICATIONS

This application claims the benefit of Provisional Application No. 60/355,422, filed Feb. 7, 2002.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The present invention relates generally to baking sets that are used for baking cakes; to molds used in baking and candy making; to multi-piece cake pans that can be used to bake either flat cakes or tube cakes; and to cake tier assembly sets that are used to create multi-tier cakes such as wedding cakes.

Multiple tier cake forms and assemblies have long been used in the baking industry. Such products are typically comprised of several parts, both large and small which are put together in various fashion to ultimately create the support structure for multiple tiered cakes, such as wedding cakes. Metallic cake form pans and molds are the usual standard for most cake pans. Plastic is generally used for manufacturing decorative tier plates and columns.

2. Description of Related Art

Creating three dimensional cake forms from the current available products has proven to be a difficult, if not impossible challenge. Essentially, there are no real systems available to create and expand the art of making three-dimensional cakes, especially those cakes whose form is that of one or more humans.

The current available multiple tier products do not focus on three-dimensional effects. Instead, the focus is on separated tiers, simple cake stacks, or form limiting structural inserts which are baked inside the cakes themselves and create serving difficulties.

Assembly and transportation of three-dimensional, cake products; especially those of the human form; has also proven to be a difficult challenge, as most of these cakes are made from whatever forms the creator can conceivably find, design, or create; from other household products; which are usually not necessarily related to baking or to cooking at all.

These difficulties and challenges have limited the bride and groom decoration to small, decorative plastic molds placed on top of the wedding cakes. More recently, the baking industry is creating cakes that have all but eliminated the need or desire to have the bride and groom incorporated or represented on the wedding cake.

Additionally, the removal procedure for most multi tier cakes; is to turn the cake upside down after baking, while still in the pan onto another surface, usually, a plate, the cake tier base, or directly on top of another cake. The user runs the risk of dropping the cake, cracking or breaking the cake, or crumbling the cake. This is especially difficult when a moist or super-moist batter is used. The only suitable cake batter for a mold or sculpture is a sturdy, thicker type of batter that will hold its shape and is inferior in taste and consistency. Super-moist and moist batters fall apart when used in a mold or sculpture. Fillings; if used at all; tend to be drier and tasteless.

What is needed is a three dimensional cake system that allows the user to create the desired human forms; quickly and easily assemble it; move or transport if necessary; and safely store the various cake components, keeping them fresh until needed. A system designed to eliminate the need for complete removal of the baked cake matter from the bake-ware, having bake-ware that works itself into the design of the cake and allows the use of moist and super-moist cake batters, which are superior in taste and consistency. Tasty fillings can then be added if desired without compromising the structure or form of the cake. Additionally, a cake system that allows the user to incorporate part of the bakeware into the structure and form, then remove the outer bake-ware afterward would provide the utmost in convenience, making a once difficult or impossible challenge, a simple and pleasurable experience, that allows the user to focus on creating artistic decoration rather than breakage and frustration.

BRIEF SUMMARY OF THE INVENTION

The present invention is of a simple, multi-piece design, wherein an artistic production of a man and woman, or bride and groom cake can be formed and crafted, having been completely assembled prior to the removal of the outer bake-ware, and can be easily moved, transported or stored until it is time for icing and decoration. When served, rods inserted into the pan insets and lifted upward remove the cake layers. Quick clean up is facilitated for the user, as the only pieces that remain with the user are the outer rims of the cake pans and the mold. The insets and decorative base are returned to the user; after the function for which the cake was crafted; is over.

Notice must be taken that the drawings are not necessarily to scale and that the embodiments are sometimes illustrated by phantom lines, and diagrammatic representations. In certain instances, details which are not necessary for an understanding of the present invention or which render other details difficult to perceive may be omitted. It should be understood, of course, that the invention is not necessarily limited to the particular embodiments illustrated herein.

DETAILED DESCRIPTION OF THE INVENTION

Figure 1:
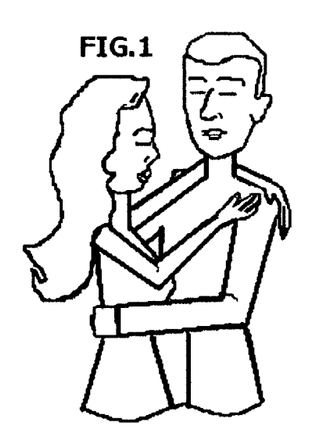
FIG. 1: Is the Right side view of finished molded product.
Figure 1A:
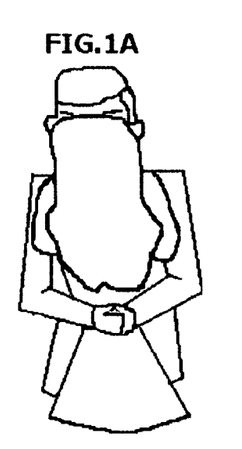
FIG. 1A: Is the Bride's rear view of finished molded product.
Figure 1B:
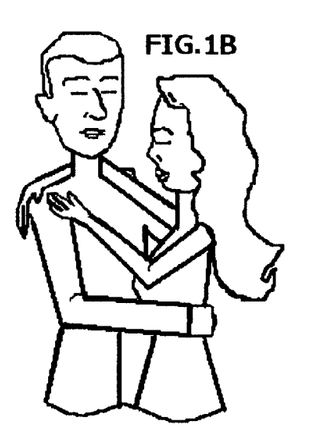
FIG. 1B: Is the Left side view of finished molded product.
Figure 1C:
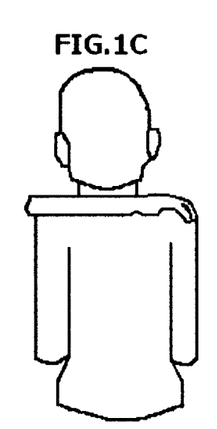
FIG. 1C: Is the Groom's rear view of finished molded product.
Figure 1D:
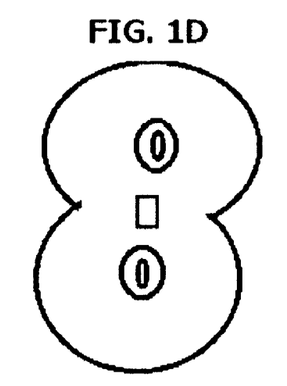
FIG. 1D: Is the Bottom view of molded finished product.

Turning first to FIG. 1, through FIG. 1C, generally shown are the views of the finished figurine, starting with the left view of the bride's, or woman's face and going around the figurine in a clockwise circle starting from the left view, and continuing to the right view of the bride's or woman's face. This is shown to generally demonstrate the three-dimensional aspect of the figurine FIG. 1D shows the bottom view of the finished figurine specifically, the mounting holes and open center hole for a lighting fixture.

Figure 2:
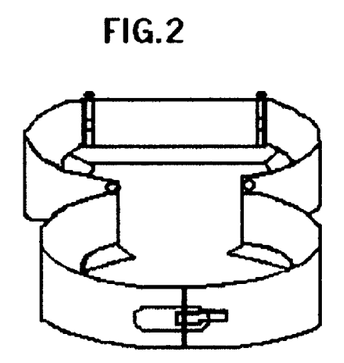
FIG. 2: Is a Perspective view closed outer rim of FIG. 8 pan, showing interior ledge.

FIG. 2 is a perspective view of the closed outer rim of the FIG. 8 pan. The figure 8 shape is used to define the form of the bodies, on the second layer of the cake structure. The inwardly directed ledge inside the rim, is where the FIG. 8 pan inset will rest. The ledge also prevents leakage of cake batter acting as a seal. The spring action clasp and spring action hinges facilitate quick removal of the outer rim of the cake when the mold and pans are assembled together.

Figure 2A:
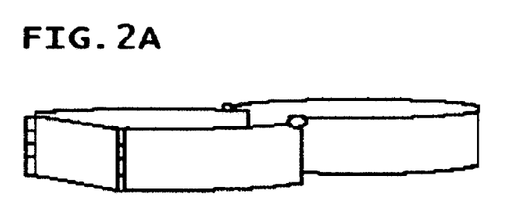
FIG. 2A: Is a Perspective side view closed outer rim of FIG. 8 pan.

FIG. 2A is a side view of the outer rim of the FIG. 8 pan.

Figure 2B:
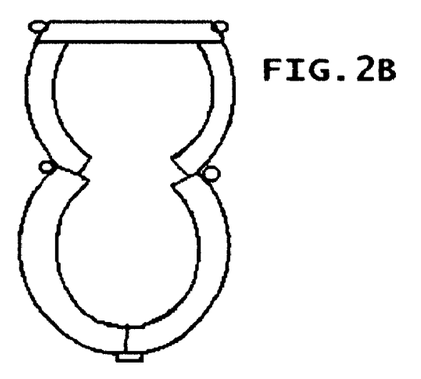
FIG. 2B: Is the Bottom view of closed outer rim of FIG. 8 pan.

FIG. 2B shows how the outer rim of the FIG. 8 pan looks from a bottom view. The ledge is clearly shown, and the overlap of the ledge parts as well.

Figure 2C:
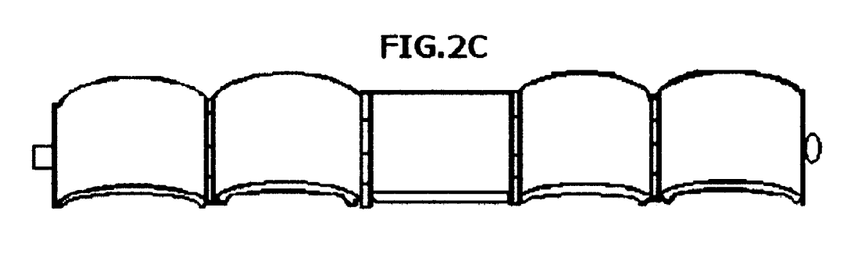
FIG. 2C: Is a Perspective view of open outer rim of FIG. 8 pan showing hinges.

FIG. 2C is a perspective view of the outer rim of the FIG. 8 pan in an open position, showing the location of the spring clasp, and spring hinges.

Figure 2D:
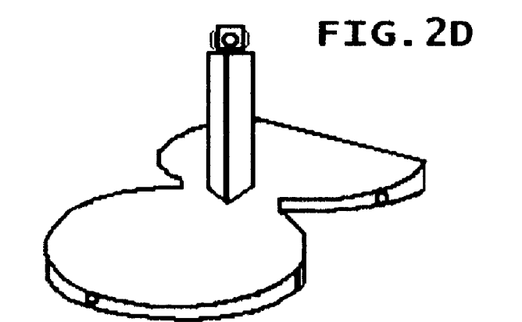
FIG. 2D: Is a Perspective view of pan inset for FIG. 8 pan.

FIG. 2D is a perspective view of the pan inset for the FIG. 8 pan. The rectangular column having the interlocking device situated at the top.

Figure 2E:
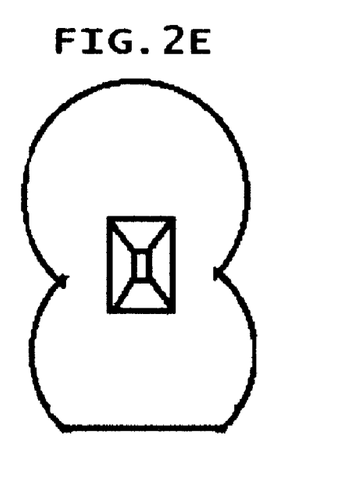
FIG. 2E: Is the Bottom view of pan inset for FIG. 8 pan.

FIG. 2E is the bottom view of the pan inset for the FIG. 8 pan.

Figure 2F:
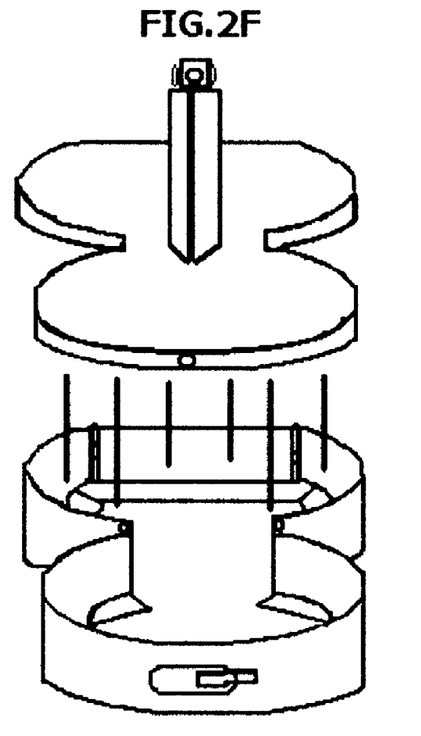
FIG. 2F: Is a perspective view of the outer rim, and flat cake inset showing the preferred insertion procedure for the FIG. 8 pan.

FIG. 2F is a perspective view of the preferred insertion of the pan inset, into the outer rim of the FIG. 8 pan. The rim is locked closed, and the pan inset is heading down in such a way as to rest on the ledge inside the rim. The FIG. 8 pan is greater in diameter than the stand and support for the molded figurine. This gradual increase in size is repeated with all of the cakes involved to achieve more stability, facilitate the placement of flowers and decoration and gives a pleasing overall appearance to the cake itself.

Figure 2G:
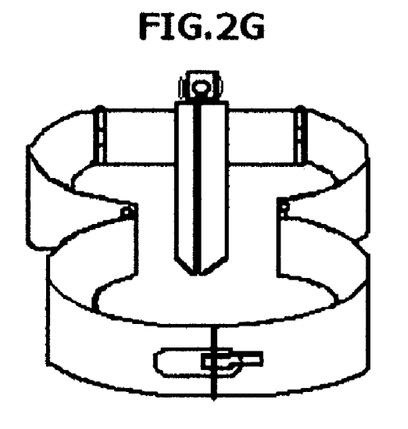
FIG. 2G: Is a perspective view of the completed FIG. 8-*pan* assembly.

FIG. 2G is a perspective view of the completed assembly of the FIG. 8 pan. The rectangular column is represented.

Figure 2H:
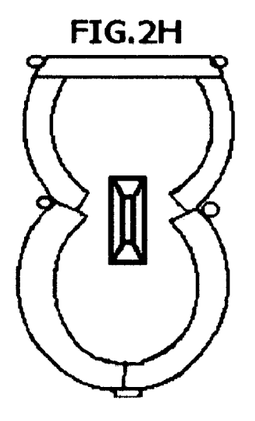
FIG. 2H: Is the bottom view of the completed FIG. 8-*pan* assembly.

FIG. 2H is the bottom view of the completed assembly of the FIG. 8 pan.

Figure 2I:
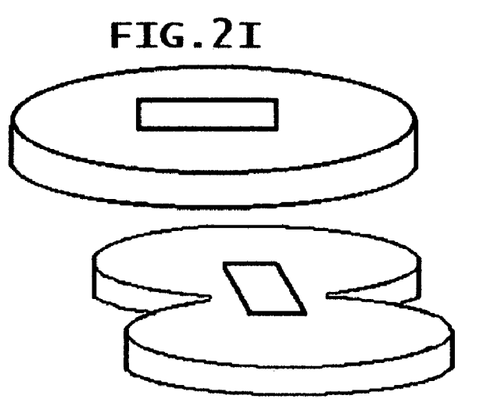
FIG. 2I: Is a perspective view of the plastic snap-on lids.

FIG. 2I is a general depiction of the snap-on plastic lids, which are used to cover the baked cakes, while still in the pan, to keep them fresh and/or facilitate transportation in an unassembled form if desired. Additionally, the lids give the user the option to bake the cakes several days in advance if needed, and quickly assemble them, remove the outer rims, and decorate as desired.

Figure 3:
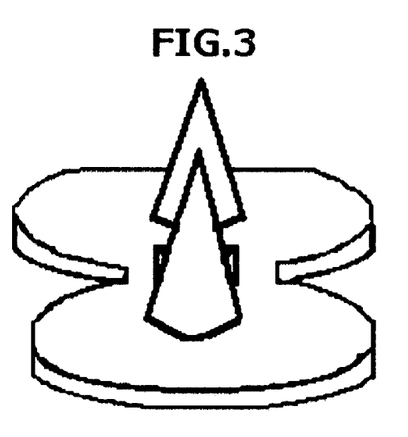
FIG. 3: Is a perspective view of the top stand and support for the molded figurine.
Figure 3A:
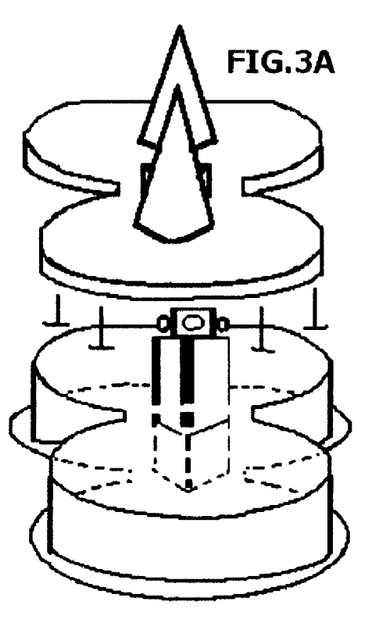
FIG. 3A: Demonstrates the preferred position of the top stand and support, in relationship to the cake, which has been created by the FIG. 8 pan.
Figure 3B:
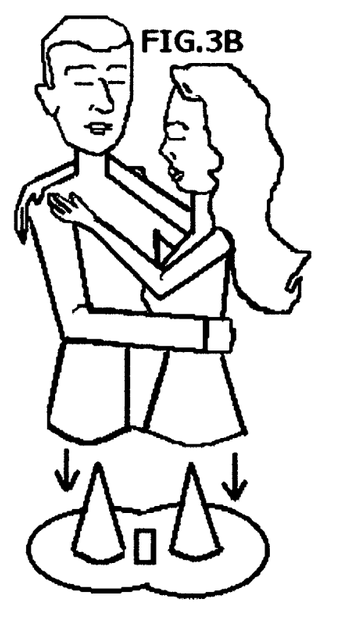
FIG. 3B: Demonstrates the preferred installation for the molded figurine atop the top stand and support.

FIG. 3 is a perspective view of the stand and support onto which is fixed the molded figurine. As demonstrated in FIG. 3A, the stand and support for the figurine fits directly onto the rectangular column, of the FIG. 8 pan's inset, with the cake in between the two. The molded figurine is then affixed onto the stand and support, (which is on the very top of the cake structure at this point), as is demonstrated by FIG. 3B.

Figure 4:
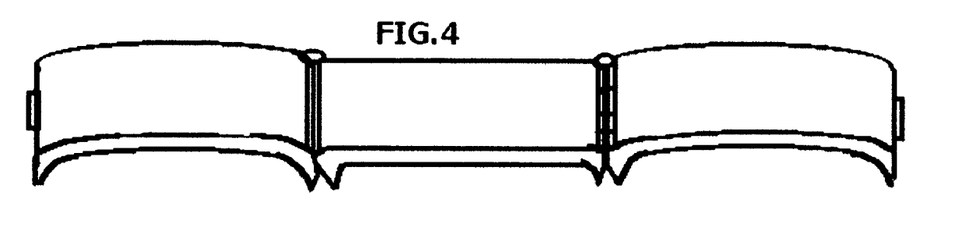
FIG. 4: Is a perspective view of the open outer rim of the cake pan having one flat side.

Referring now to FIG. 4, it is generally shown at FIG. 4, how the open outer rim of the cake pans having one flat side, are spring hinged on the right side and left of the flat side of the pan rim. The spring action clasp parts are located on the opposite side in the front. This is done to facilitate easy removal of the outer rim after it is sprung open.

Figure 4A:
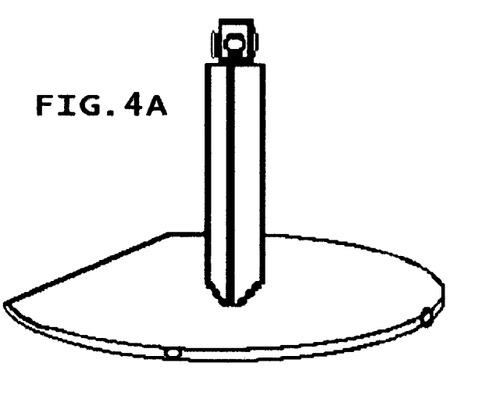
FIG. 4A: Is a Perspective view of the flat cake pan inset for the cake pan having one flat side.

FIG. 4A is a perspective view of the pan inset for the outer rim shown in FIG. 4. The rectangular column is shown in greater detail, having the smaller rectangular top of the column, which is used to facilitate interlocking between the columns, when the cake structure is assembled. The pan insets for all of the cake pans become the central tier support inside the cakes and structure when assembled. They remain inside the cake until the cake is consumed and then are washed and returned to the bakery or user, along with the base, light fixture, and removal rods.

Figure 4B:
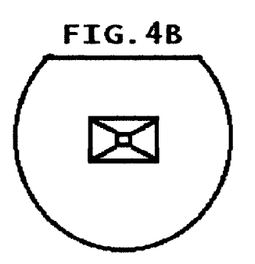
FIG. 4B: Is the bottom view of the flat cake pan inset for the cake pan having one flat side.

FIG. 4B is a bottom view of the pan inset for FIG. 4. These pans have one flat side. They are designed that way, in order to achieve the effect of the groom's or man's legs down one side of the cake. When decorating, the user can create the effect of the bride's or woman's gown sweeping and swirling around the back of the groom's or man's legs with frosting or fondant, lending dramatic effect to the overall appearance of the cake.

Figure 4C:
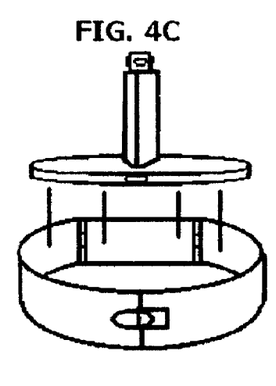
FIG. 4C: Is a perspective view of the outer rim and flat cake inset, showing the preferred insertion procedure for the cake pan having one flat side.

FIG. 4C shows the preferred insertion of the pan inset as shown in FIG. 4A, into the outer rim, as shown in FIG. 4. The pan inset will rest on the inside ledge of the rim, preventing leakage.

Figure 4D:
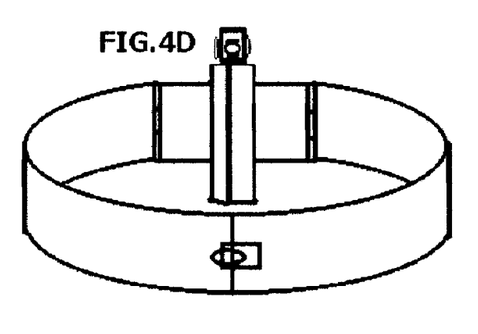
FIG. 4D: Is a perspective view of the completed assembly for the cake pan having one flat side.

FIG. 4D is a perspective view of the completed assembly of the pan as shown in FIGS. 4, 4A, and 4C. The spring hinge is shown in the proper positions on the flat side of the rim. The spring clasp is on the opposite side of the rim.

Figure 4E:
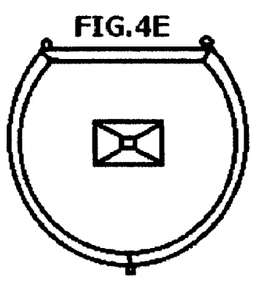
FIG. 4E: Is the bottom view of the completed assembly for the cake pan having one flat side.

FIG. 4E is a bottom view of the completed assembly of the flat-sided pan. The pan inset is resting on the ledge, and the inside of the rectangular column is visible from the bottom of the pan, through to the top. Both ends of this rectangular column are open to facilitate a lighting fixture to be threaded through to the top of the cake structure, and affixed to the center of the molded figurine, illuminating the faces of the figures on top of the cake.

Figure 4F:
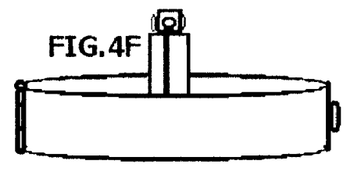
FIG. 4F: Is a side elevational view of the completed assembly for the cake pan having one flat side.

FIG. 4F is an elevational side view of the pan when the assembly is completed.

Figure 5:
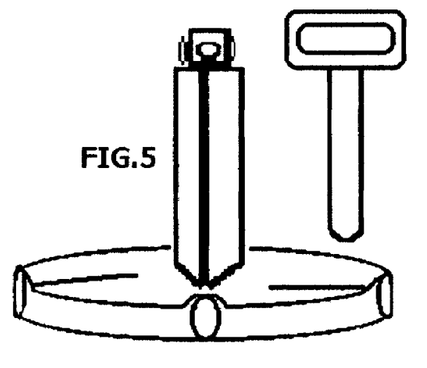
FIG. 5: Is a close up view of the pan insets for all of the pans, showing the molded cylindrical chamber areas used to facilitate insertion of the removal rods, the rod pictured here.

FIG. 5 generally shows the planar pan inset has cylindrical molded chamber areas to facilitate the insertion of the removal rods, which are shown in FIG. 5. The physical design of each pan inset is such that a perfect horizontal balance may be maintained when assembly of the cake structure is completed. Quick clean up is facilitated because the only parts remaining with the user at the time of assembly are the outer rims of the pans, the mold, and the plastic lids. The pan insets have become part of the cake structure, and are returned to the user at a later date, along with the decorative base.

Figure 6:
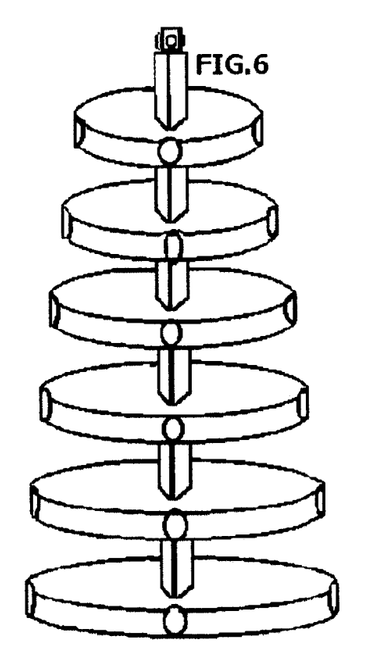
FIG. 6: Is a perspective view demonstrating the orientation of the pan insets, after they are assembled inside the whole cake structure.

FIG. 6 shows the orientation of the pan insets inside of the cake structure without attaching the decorative base. This assembly is the skeleton of the cake structure, and remains within the cake. The layers are removed with the removal rods when serving. The removal rods can remove either one empty inset, after all of the cake on that inset is served, or the rods can remove an entire layer of the cake at a time.

Figure 6A:
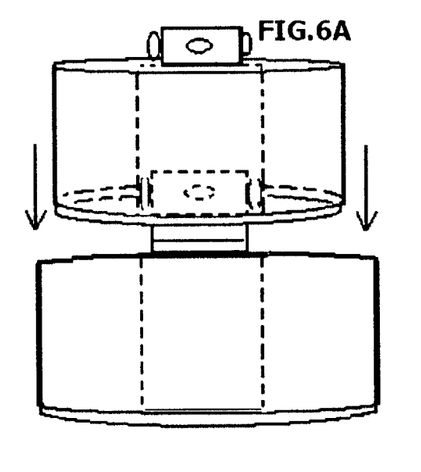
FIG. 6A: Is a perspective view demonstrating how said vertical rectangular column, with smaller diameter rectangular attachment, fits together between the cakes, creating a central interlocking support pole for the entire cake structure.

FIG. 6A is a perspective view showing the detail of how a rectangular column is positioned inside the cake, and how the rectangular columns connect within the cake structure.

Figure 7:
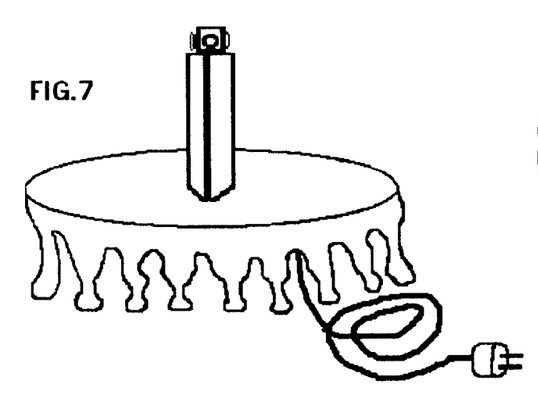
FIG. 7: Is a perspective view of the decorative base for the cake structure.
Figure 7A:
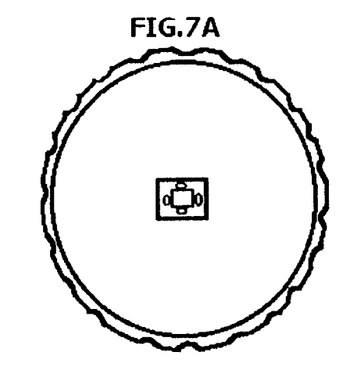
FIG. 7A: Is a top perspective view of the decorative base, showing the top of the vertical rectangular column.
Figure 7B:
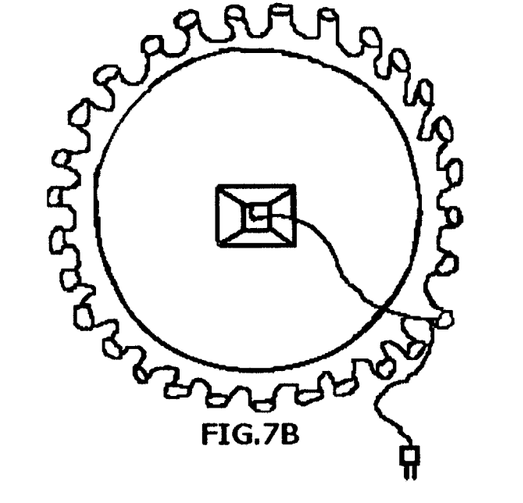
FIG. 7B: Is a bottom view of the decorative base, showing how a light fixture may be added.

FIG. 7 is a perspective view of the decorative base. The rectangular column is represented here, and the top of the rectangular column can be seen in FIG. 7A, which is a top perspective view of the decorative base. FIG. 7B is a view of the bottom of the decorative base showing the open ended rectangular column, and a light fixture cord threaded through it.

Figure 8:
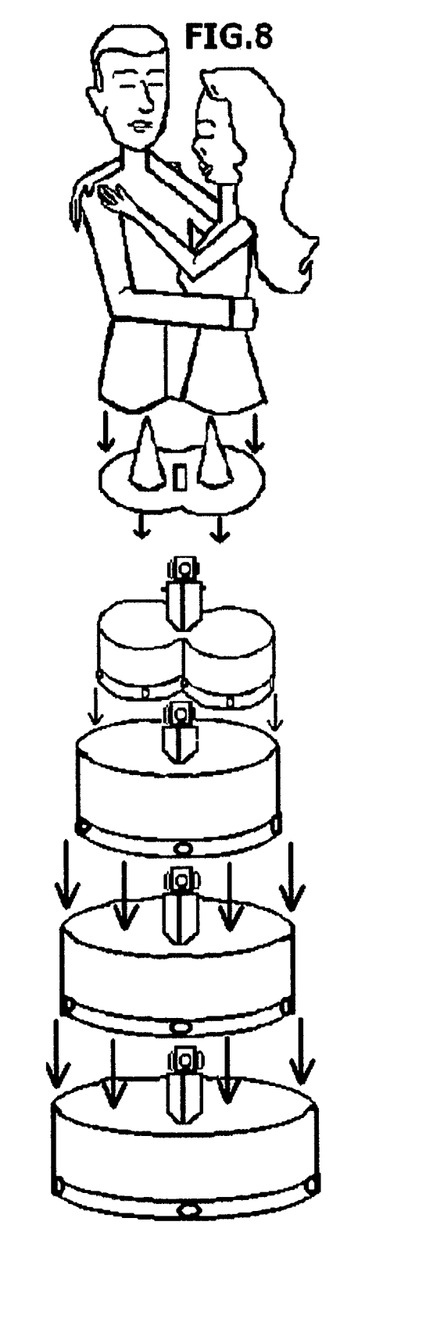
FIG. 8: Is a perspective view of the top molded figurine product, the stand and support for the figurine, the FIG. 8 cake, and the cakes having one flat side, demonstrating the orientation and positional relationship of each of the parts when molded, baked, assembled and outer rims are removed from the cakes.

Referring now to FIG. 8. It is generally shown in an exploded view, the orientation and positional relationship of the molded figurine, the stand and support, the FIG. 8 cake made from the FIG. 8 pan, and the first three layers of cake made from the flat sided pan.

Figure 8A:
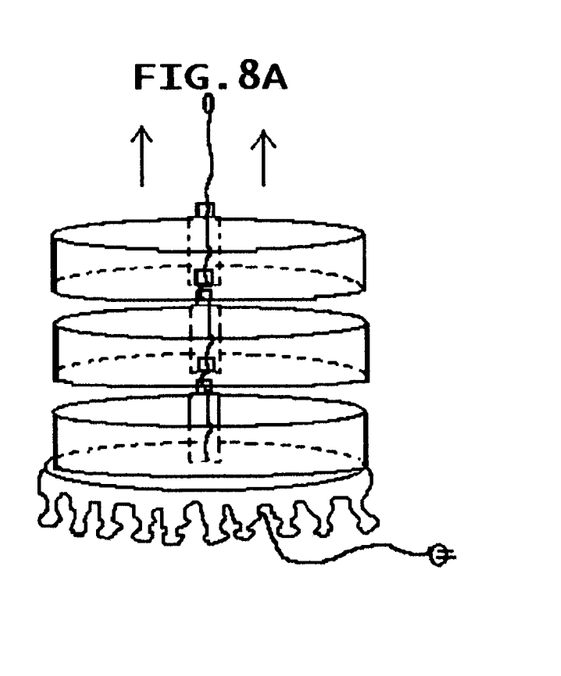
FIG. 8A: Is a perspective view of the lower cakes and decorative base, and their positional relationship, when molding, baking, and assembling are finished, and outer rims of cake pans are removed.

FIG. 8A is a continuation of FIG. 8, showing the lower three cakes and decorative base attached together by rectangular columns inside each one. The lighting fixture is shown threaded through here.

Figure 8B:
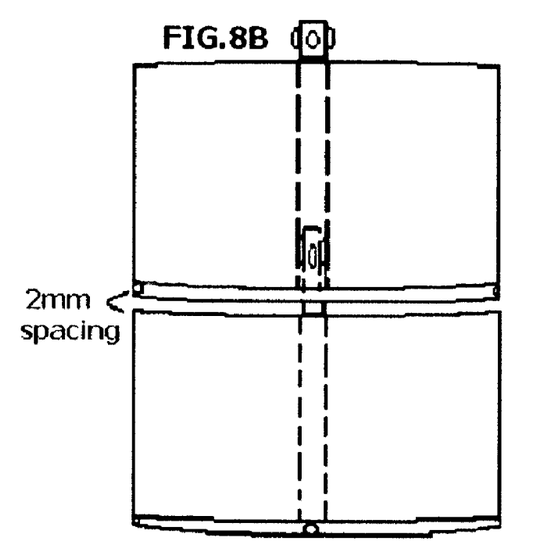
FIG. 8B: Is a perspective view of the 2 mm space between the finished cakes when assembled.

FIG. 8B shows the 2 mm space between the cakes, as they rest on the center rectangular column supports. This 2 mm space is provided to enable the user to ice the top of each cake, preventing the cake above from resting on the cake top itself, thereby creating a more attractive end result when the cake layers are removed for serving, rather than the conventional methods, which produce a mess when the layers are removed, or when the tier supports are removed. The 2 mm space is easily disguised with icing and/or decoration.

Figure 9:
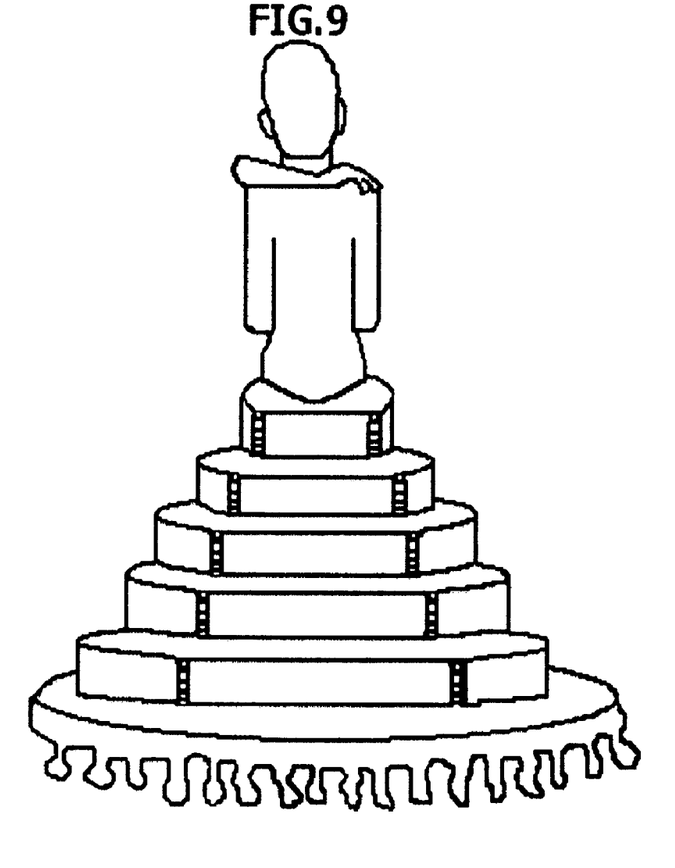
FIG. 9: Is a rear view of the groom, demonstrating how the molded figure and the cakes are situated after the mold has been removed and attached to the cake assembly, before the outer rims of the pans have been removed, and shows the position of the hinges on the outer rims.

FIG. 9 is the rear view of the Groom, or man, demonstrating the orientation of the molded figurine, the FIG. 8 cake, the remaining flat-sided cakes and the decorative base, when assembled and before the outer rims are sprung and removed. The hinges on the outer rims are aligned on the same side.

Figure 10:
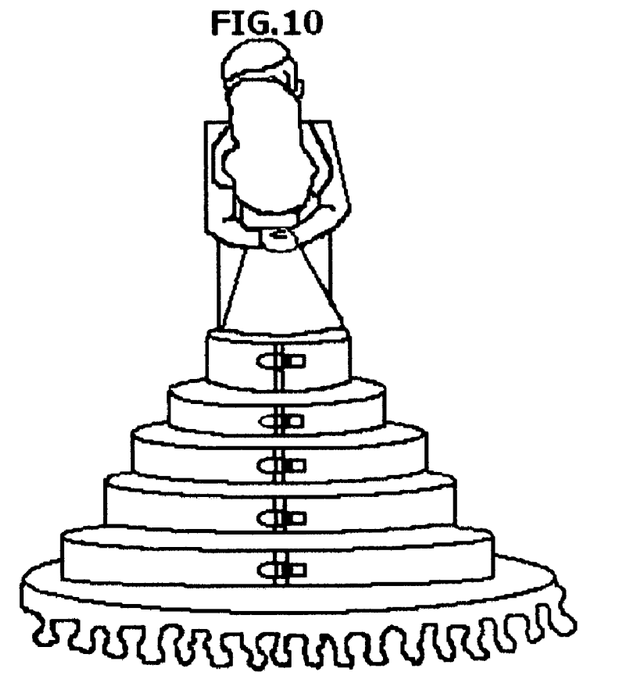
FIG. 10: Is a rear view of the bride, demonstrating how the molded figure and the cakes are situated after the mold has been removed and attached to the cake assembly, before the outer rims have been removed, and shows the position of the spring action clips on the outer rims.

FIG. 10 is the rear view of the bride, or woman, demonstrating the orientation of the molded figurine, the FIG. 8 cake, the remaining flat-sided cakes and the decorative base when assembled and before the outer rims are sprung and removed. The spring action clasps are aligned on the same side.

Figure 11:
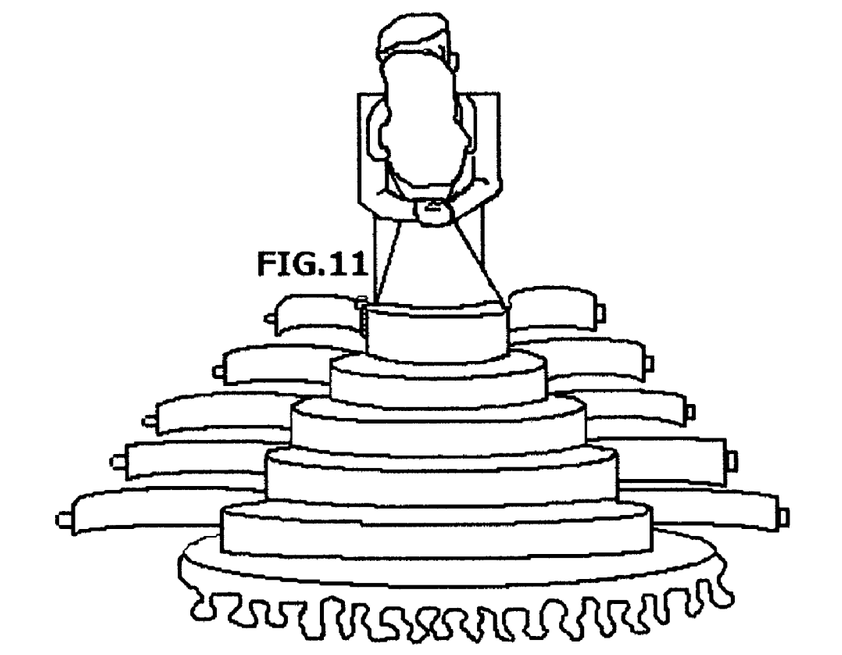
FIG. 11: Is a rear view of the bride and cakes, showing how the outer rims of the cake pans are sprung open and removed.

FIG. 11 demonstrates how the cake structure looks when assembled, and the outer rims are sprung, ready to be removed. If desired, the user may run a thin blade knife around the inside of the sidewalls of each cake pan before assembling, thereby loosening the cake from the sidewalls, to facilitate easier removal of the sidewalls. By creating the ability to assemble all of the cake parts prior to removing the outer bake-ware, the task of assembling, moving, transporting, and/or storing becomes an enjoyable task, rather than having to deal with the frustrations of turning the cakes out onto tier bases, blindly aligning holes up for column supports, and the like.

Figure 12:
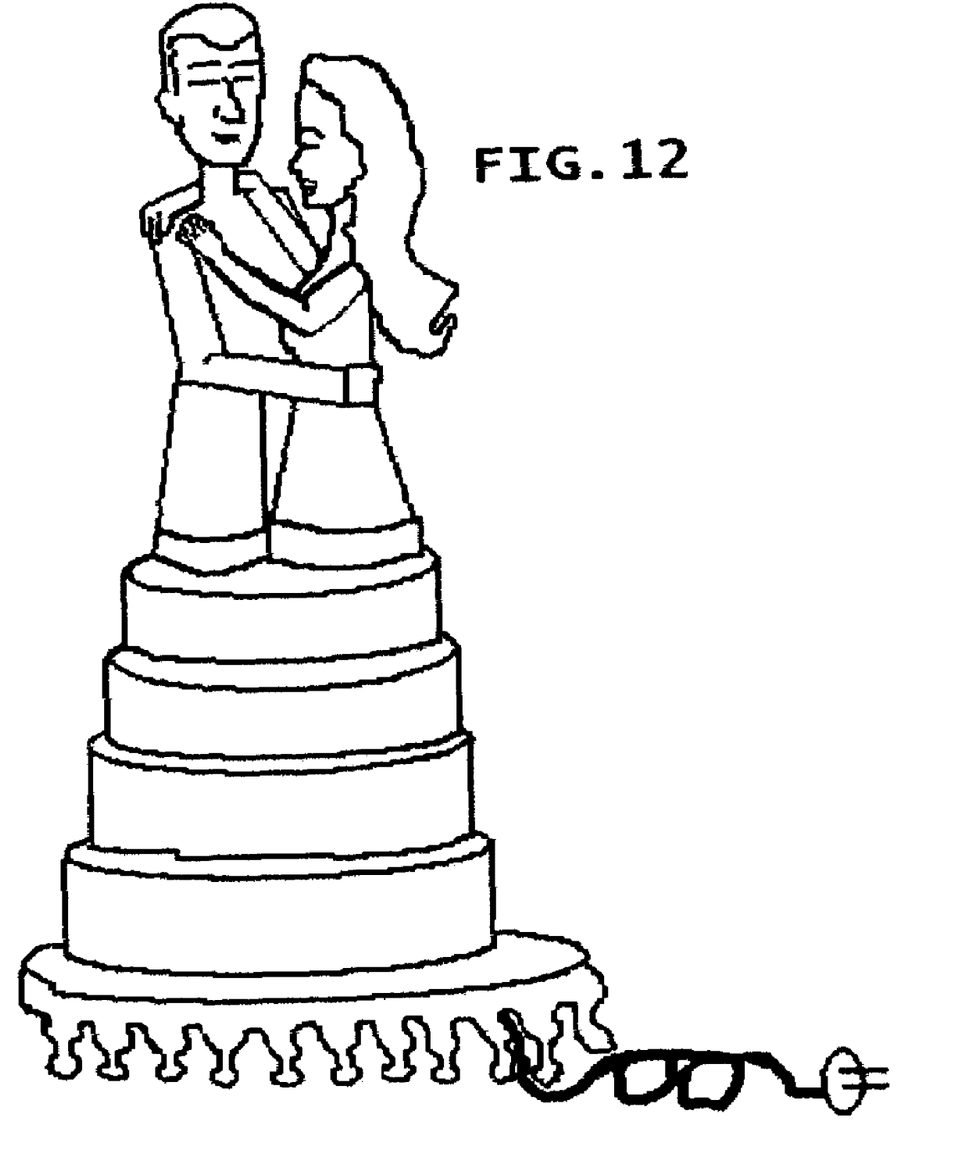
FIG. 12: Is a left side view of the completed assembly, ready to be iced and decorated.

FIG. 12 is the left side view of the completed assembly ready to be iced and decorated as desired.

It should be noted that the above described embodiment is intended to illustrate, rather than limit the invention and that numerous modifications could be made thereto without departing from the scope of the invention as defined by the appended claims. Clearly, it is within the contemplation of the present invention that the specific physical dimensions of the mold, outer rims, the flat cake insets, the rectangular columns and the decorative base could all be slightly modified, while still retaining the necessary function and quick removal described above.

While the present invention has been illustrated in some detail according to the preferred embodiment shown in the foregoing drawings and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims, and not by any specific wording in the foregoing description.

I claim:

1. A bride and groom wedding cake kit comprising a cake pan having the shape of a figure eight, the cake pan being so shaped as to create the form of the bottom portion of two bodies and to become the first pan in a series of pans to create a bride and groom cake, the cake pan comprising a removable spring-action outer rim, the outer rim comprising:

a vertical rounded sidewall member and a flat inward directed ledge extending perpendicularly inwardly from a bottom edge of the rounded sidewall member, the rounded sidewall member including a spring action clip part on one end of the rounded sidewall member, and the rounded sidewall member further including spring action hinge parts on the rounded sidewall member on opposing sides of the rounded sidewall member, wherein the spring action clip part is located on both opposing sides of the rounded sidewall member so as to close the rounded sidewall member when in a closed position, and a flat sidewall member attached to an end of the rounded sidewall member opposite the end including the spring action clip part, with spring action hinge parts attaching ends of the flat sidewall member to the rounded sidewall member; wherein a flat cake inset may be downwardly inserted into the outer rim and supported by the ledge.

2. The bride and groom wedding cake kit as described in claim 1, wherein the cake pan is further comprising a flat cake inset, having the shape of a figure eight, separate and apart from the outer rim, having a substantially horizontal planar bottom and a substantially vertical rectangular column attached having open upper and lower ends with the top diameter of the column having a smaller diameter, open ended, rectangular, attachment formed into the overall form of the column, the lower end being attached within an approximate center of the horizontal bottom; having interlocking devices at the top of the rectangular attachment for stacking and connecting to become a part of the interior support structure for the cake, the flat cake inset able to be downwardly inserted into the outer rim when it is closed and the spring locked, and supported by the interior ledge.

3. The bride and groom wedding cake kit as described in claim 2 wherein the cake pan inset is further comprising cylindrical chambers in the top side of the horizontal planar bottom, to accommodate removable rods that may be inserted to facilitate easy removal of cake layers when serving.

4. The bride and groom wedding cake kit as described in claim 1 wherein the cake pan is further comprising an attachable plastic lid for storage or to preserve freshness and a connectable top stand and support plate, to facilitate a molded figurine, the plastic lid having one or more spikes on the top side of the top stand and support plate used for attaching the figurines if desired.

5. The bride and groom wedding cake kit as described in claim 1 further comprising four or more cake pans the cake pans comprising a removable spring-action outer rim, the outer rim comprising:

a vertical rounded sidewall member, and a flat sidewall member, with spring action hinge parts attaching ends of the flat sidewall member to the rounded sidewall member, a flat inward directed ledge extending perpendicularly inwardly from a bottom edge of both the rounded sidewall member and the flat sidewall member respectively wherein in a flat cake inset may be downwardly inserted into the outer rim and supported by the ledge, with the rounded sidewall member further including a spring-action clip part wherein the spring action clip part is located on both opposing sides of the rounded sidewall member so as to close the rounded sidewall member when in a closed position, the cake pans being the balance of the cake pans needed to complete the bride and groom cake.

6. The bride and groom wedding cake kit as described in claim 5 wherein the cake pans are further comprising flat cake insets shaped like the rim, separate and apart from the outer rim having a substantially horizontal planar bottom and a substantially vertical rectangular column attached having open upper and lower ends with the top diameter of the column having a smaller diameter open ended rectangular attachment formed into the overall form of the column, the lower end being attached within an approximate center of the horizontal bottom, having interlocking devices at the top of the rectangular attachment for stacking and connecting to become the interior support structure of the bride and groom figure cake, the flat cake insets able to be downwardly inserted into the outer rim when they are closed and the spring clips are locked.

7. The bride and groom wedding cake kit as described in claim 6 wherein the insets are further comprising cylindrical chambers in the top side of the horizontal planar bottom to accommodate removable rods that may be inserted to facilitate easy removal of cake layers when serving.

8. The bride and groom wedding cake kit as described in claim 5 wherein the cake pans are further comprising attachable plastic lids for storage or to preserve freshness.

9. The bride and groom wedding cake kit as described in claim 5 wherein the cake pans have varied, graduated sizes to facilitate strength and balance in the overall cake structure.

10. The bride and groom wedding cake kit as described in claim 6 wherein the stacked insets are connectable to the cake pan inset of the figure eight pan on the under side, and also connectable to the upper side of a round, unitary decorative base, that is located at the bottom of the entire cake structure, wherein the decorative base is comprising:

a substantially horizontal planar top and bottom, with a substantially vertical rectangular column having open upper and lower ends with the top diameter of the column having a smaller diameter open ended rectangular attachment formed into the overall form of the column, the lower end being attached within an approximate center of said the horizontal top of the base, the connections of all parts creating an interior support structure for the bride and groom cake with 2 millimeter spacing between the cakes when stacked.

* * * * *